(12) United States Patent
Tong

(10) Patent No.: US 7,552,806 B2
(45) Date of Patent: Jun. 30, 2009

(54) EXTENSIBLE ELECTRICAL CONNECTING DEVICE

(76) Inventor: Sammy Fai Sai Tong, Rm.,813 Nan Fung Centre,246-298 Castle Peak Road, Tsuen Wan, N.T., H.K. (CN)

( * ) Notice: Subject to any disclaimer, the term of this patent is extended or adjusted under 35 U.S.C. 154(b) by 414 days.

(21) Appl. No.: 11/476,249

(22) Filed: Jun. 27, 2006

(65) Prior Publication Data

US 2007/0295571 A1 Dec. 27, 2007

(51) Int. Cl.
*A47L 9/00* (2006.01)
(52) U.S. Cl. .................. 191/12 R; 15/323; 16/429; 172/372; 30/296.1; 403/109.1; 403/109.2
(58) Field of Classification Search .............. 191/12 R, 191/12.2 R, 12.4; 15/323, 410; 16/427, 16/429; 172/372; 30/296.1; 403/109.1, 403/109.2, 109.3
See application file for complete search history.

(56) References Cited

U.S. PATENT DOCUMENTS 4,976,031 A * 12/1990 Miller .................. 30/296.1
7,025,383 B2 * 4/2006 Canale ..................... 285/7

* cited by examiner

*Primary Examiner*—Mark T Le

(57) ABSTRACT

An extensible electrical connecting device comprises an extensible supporting bar device and an extensible electric cable. The extensible electrical connecting device further comprises a first electrical connecting base which is connected to one end of the extensible supporting bar device and connected to one end of the extensible electric cable and a second electrical connecting base which is connected to another end of the extensible supporting bar device and connected to one end of the extensible electric cable. Therefore the extensible electric cable is capable to extend its length along with the extending motion of the extensible supporting bar device so as to provide an electrical connection between the first electrical connecting base and the second electrical connecting base.

11 Claims, 5 Drawing Sheets

US 7,552,806 B2

EXTENSIBLE ELECTRICAL CONNECTING DEVICE

BACKGROUND OF THE PRESENT INVENTION

1. Field of Invention

The present invention relates to an electrical connecting device, and more particularly to an extensible electrical connecting device which allows the extensible electric cord to have an adjustable length and at the same time to provide a power source to the work piece.

2. Description of Related Arts

Conventional extensible tubes used in a vacuum machine have many disadvantages. Their extensible mechanisms have complicated structures therefore the manufacturing cost is high and the installation and repair are difficult. It is also often found that their durability is low as that their performance drastically decreases after a period of use.

SUMMARY OF THE PRESENT INVENTION

A main object of the present invention is to provide an extensible electrical connecting device which comprises an extensible supporting bar device and an extensible electrical cable so that the extensible electrical connecting device can provide an electrical connection between the two ends of the extensible electrical connecting device while it is extending or retracting.

Another object of the present invention is to provide an extensible electrical connecting device which uses an electrical connecting element to maintain the electrical connection of the extensible electrical connecting device while extending or retracting.

Another object of the present invention is to provide an extensible electrical connecting device which is capable of extending and retracting by use of the extensible supporting bar device.

Another object of the present invention is to provide an extensible electrical connecting device which comprises two electrical connecting bases, so as to provide a connection between the power source and the extensible electrical connecting device.

Another object of the present invention is to provide an extensible electrical connecting tube wherein the extensible supporting bar device has slots coupling with the each other so that the tube can stabilize its position and to avoid any kind of rotational problem.

Another object of the present invention is to provide an extensible electrical connecting device wherein the extensible electrical connecting device has a locking mechanism so that the respective distance between the two ends of extensible electrical connecting device can be fixed.

Another object of the present invention is to provide a mobile electrical device which comprises an extensible electrical connecting device so that the mobile electrical device is extensible, easy to use, and reliable.

Accordingly, in order to accomplish the above objects, the present invention provides an extensible electrical connecting device which comprises:

An extensible supporting bar device;

an extensible electrical cable;

a first electrical connecting base wherein is connected to one end of the extensible supporting bar device and connected to one end of the extensible electrical cable;

a second electrical connecting base wherein is connected to another end of the extensible supporting bar device and connected to another end of the extensible electrical cable.

DETAILED DESCRIPTION OF THE PREFERRED EMBODIMENT

Figure 1:
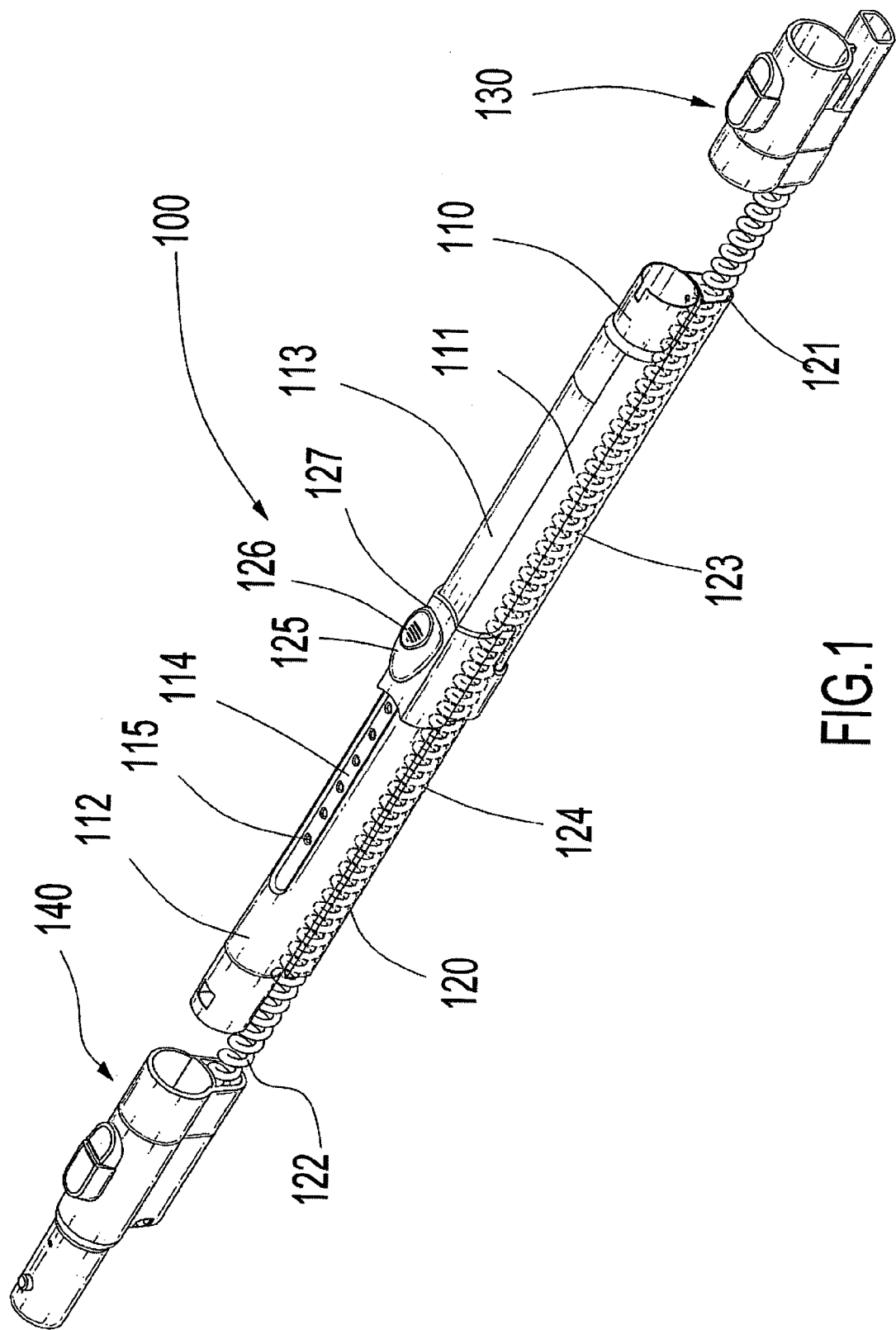
FIG. 1 is an explode perspective view of the extensible electrical connecting device according to the preferred embodiment of the present invention.

Referring to FIG. 1 of the drawings, an extensible electrical connecting device 100 according to a first preferred embodiment of the present invention is illustrated. According to the first preferred embodiment of the present invention, the extensible electrical connecting device 100 comprises an extensible supporting bar device 110, an extensible electrical cable receiving device 120, a first electrical connecting base 130, and a second electrical connecting base 140. Both ends of the extensible supporting bar device 110 and the extensible electrical cable receiving device 120 are respectively connected to the first electrical connecting base 130 and the second electrical connecting base 140. The extensible electrical cable receiving device 120 has a groove 121 within, wherein comprises an extensible electric cable 122 installed there within which is made of elastic material mainly capable of stretching. Both ends of the extensible electric cable 122 are respectively connected to the first electrical connecting base 130 and the second electrical connecting base 140. Aside from providing an electrical connection to the extensible electric cable 122, the first electrical connecting base 130 and then second electrical connecting base 140 also provide a rigid connection between the extensible supporting bar device 110 and the extensible electrical cable receiving device 120.

The extensible supporting bar device 110 comprises a first supporting bar 111 and a second supporting bar 112. The extensible electrical cable receiving device comprises a first receiving member 123 and a second receiving member 124. The second supporting bar 112 is circularly engaged within the first supporting bar 111 and the second receiving member 124 is engaged within the first receiving member 123. In addition, the first supporting bar 111 and the first receiving member 123 are fixed and connected together through the first electrical connecting base 130. The second supporting bar 112 and the second receiving member 124 are fixed and connected together through the second electrical connecting base 140. Therefore the distance between the first electrical connecting base 130 and the second electrical connecting base 140 can be changed by the extending or retracting motion of the extensible supporting bar device 110. According to the preferred embodiment of the present invention, the extending or retracting motion of the extensible supporting bar device 110 offers a synchronize coaxial length change between the first electrical connecting base 130 and the second electrical connecting base 140.

According to the preferred embodiment of the present invention, the first supporting bar 111 comprises a first slot 113, and the second supporting bar 112 comprises a second slot 114 which further comprises a plurality of indentions 115. The indention 115 is in a hemisphere shape indented into the second slot 114 so that the distance can be fixed between the first electrical connecting base 130 and the second electrical connecting base 140. The first slot 113 couples with the second slot 114 so that the position can be stabilized and can eliminate any kind of rotational problem while extending or retracting.

The extensible electrical cable receiving device 120 comprises a lock mechanism 125 which is installed on the outer surface of the first receiving member 123. The lock mechanism 125 further comprises a lock 126 and a spring unit 127, and the lock 126 engages with the indention 115 to form a lock structure 128 so as to lock the distance between the first electrical connecting base 130 and the second electrical connecting base 140. When a pressure is exerted on the spring unit 127, the lock 126 disengages with the indention 115 so that the distance between the first electrical connecting base 130 and the second electrical connecting base 140 can be adjust manually. The utilization of the spring unit 127 enables the lock structure 128 to function which the enforcing and releasing of the spring unit 127 determines the engagement and release between the lock 126 and the indention 115.

According to the preferred embodiment of the present invention, one end of the first supporting bar 111 and the first receiving member 123 engages and connects to the first electrical connecting base 130, and one end of the second supporting bar 112 and the second receiving member 124 engages and connects to the second electrical connecting base 140. Therefore, when the distance between the first supporting bar 111 and the 25 second supporting bar 112 changes, the distance between the first receiving member 123 and the second receiving member 124 changes in a same fashion with respect to the distance between the first supporting bar 111 and the second supporting bar 112. As a result, the extensible electrical connecting device 100 is capable of extending and retracting.

When the extensible electrical connecting device 100 is in an extending or retracting motion, the extensible electric cable 122 installed within the groove 121 uses its elastic characteristic to extend or retract along the extensible electrical cable receiving device 120 between the first electrical connecting base 130 and the second electrical connecting base 140 and to provide a stable electrical connection between the first electrical connecting base 130 and the second electrical connecting base 140. It is worth to mention that in the preferred embodiment, the extensible electric cable 122 is used as an electrical connection media to provide an electrical connection between the first electrical connecting base 130 and the second electrical connecting base 140. It should be noted that this electrical connection media should not be limited to the use of the extensible electric cable 122 only. Therefore, any devices that fulfill the purpose of retractable and provide an electrical connection should be regarded as an alternative embodiment of the present invention.

Figure 2:
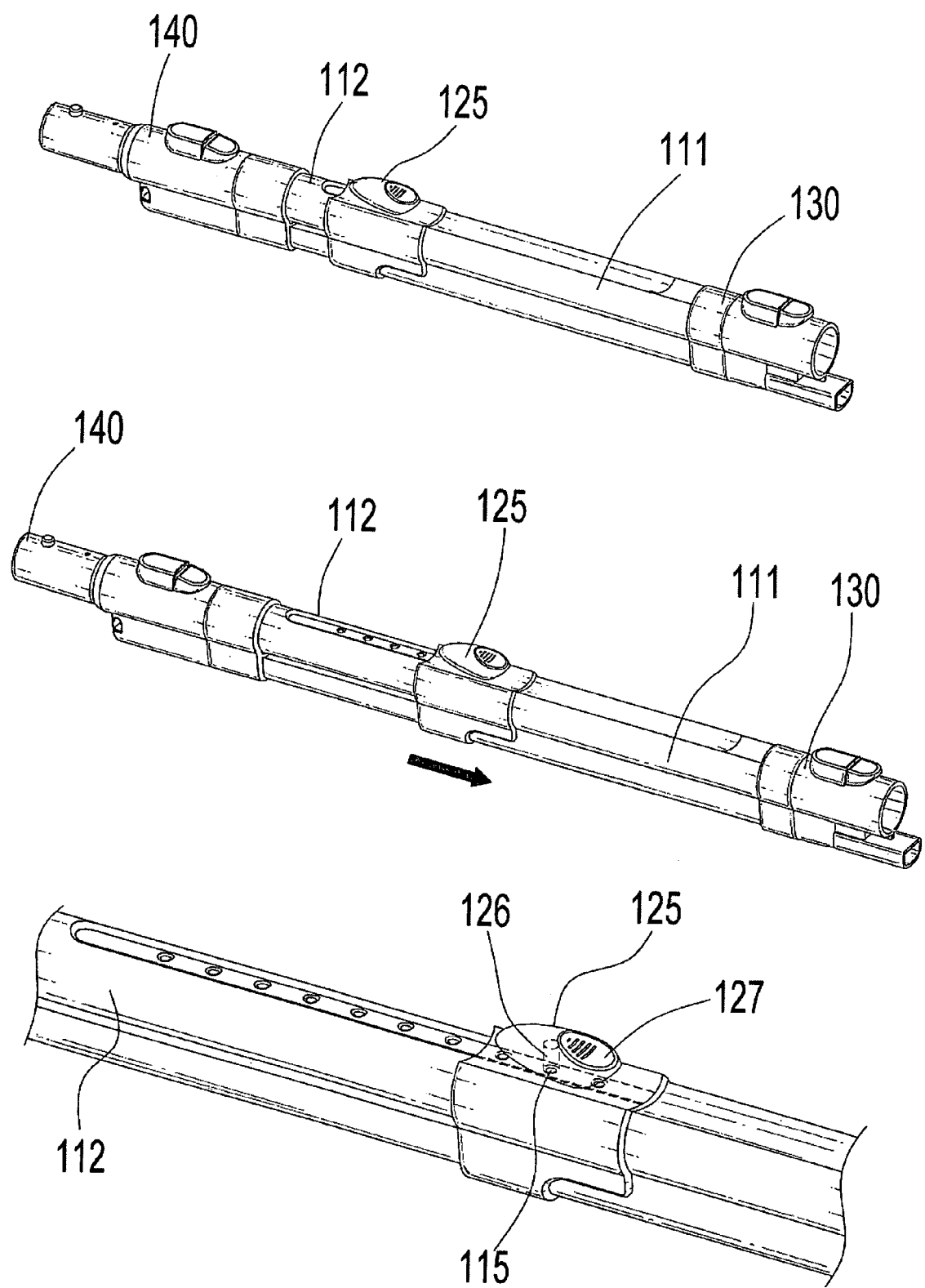
FIG. 2 is a series of perspective views that illustrates the steps for the extending motion of the extensible electrical connecting device according to the preferred embodiment of the present invention

Referring to FIG. 2 of the drawings, the operating procedure of the extensible electrical connecting device 100 according to the preferred embodiment of the present invention is illustrated. First, exert a pressure on the lock mechanism 125 to release to connection between the first supporting bar 111 and the second supporting bar 112. And then, extend the distance between the first supporting bar 111 and the second supporting bar 112 so as to reach a desired position between the first electrical connecting base 130 and the second electrical connecting base 140. One end of the first supporting bar 111 and the first receiving member 123 engages and connects to the first electrical connecting base 130, and one end of the second supporting bar 112 and the second receiving member 124 engages and connects to the second electrical connecting base 140. Therefore, when the distance between the first supporting bar 111 and the second supporting bar 112 changes, the distance between the first receiving member 123 and the second receiving member 124 changes in a synchronized coaxial fashion with respect to the distance between the first supporting bar 111 and the second supporting bar 112. And then, release the pressure on the lock mechanism 125 50 that the spring unit 127 can return the lock 126 to its original position to engage with the indention 115 and to lock the unit.

The preferred embodiment uses the extensible electric cable 122 to provide an electrical connection between the first electrical connecting base 130 and the second electrical connecting base 140 while the extensible electrical connecting device is in an extending or retracting motion. The extensible electric cable 122 can also provide a 30 stable electrical connection between the first electrical connecting base 130 and the second electrical connecting base 140 regardless of the distance between them. Therefore, any power input from the electrical connecting base can be transferred to the other end with the use of the extensible electric cable 122 wherein it also provides an extensible feature, and is easy to control, and reliable. The preferred embodiment uses the extensible supporting bar device 110 as the main supporting structure for the extensible electrical connecting device 100 so as to improve the overall strength of the extensible electrical connecting device 100.

It is worth to mention that in the preferred embodiment, the locking media should not be limited to the use of the lock structure 128 only. Any devices that can fulfill the purpose of locking the distance between the first supporting bar 111 and the second supporting bar 112 should be regarded as an alternative embodiment of the present invention. It is also worth to mention that in the preferred embodiment, the use of the slot structure should not be limited. Any devices that can stabilize the position and avoid rotation problem between the first supporting bar 111 and the second supporting bar 112 should be regarded as an alternative embodiment of the present invention.

Figure 3:
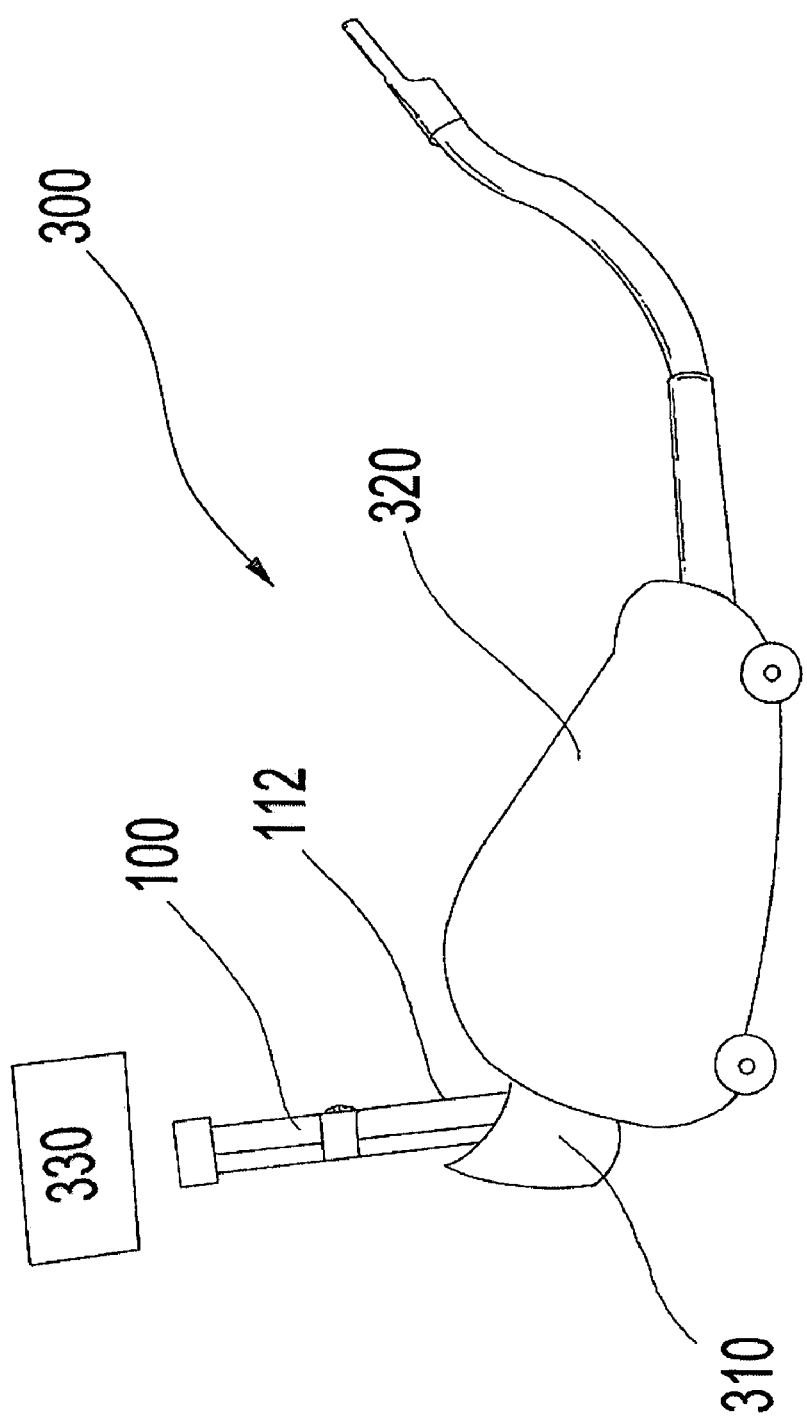
FIG. 3 is a perspective view of the vacuum machine with the use of the extensible electrical connecting device according to the preferred embodiment of the present invention.

Referring to FIG. 3 of the drawings, a vacuum machine 300 is illustrated. The vacuum machine 300 comprises the extensible electrical connecting device 100, a power input 310, and a vacuum unit 320. The power input 310 provides a connection between the second electrical connecting base 140 and the vacuum unit 320. A power source 330 is connected to the first electrical connecting base 130 so as to provide an electrical source to the vacuum unit 320 to function. The extensible electrical connecting device 100 can provide an extensible, easy to control, and reliable connection between the vacuum machine 300 and the power source 330. It is worth to mention that the use of the extensible electrical connecting device 100 should not be limited to the application of a vacuum machine as stated above. The present invention is useful to any electrical device that requires the use of electrical connecting device which can provide an extensible, easy to use, and reliable connection.

Figure 4:
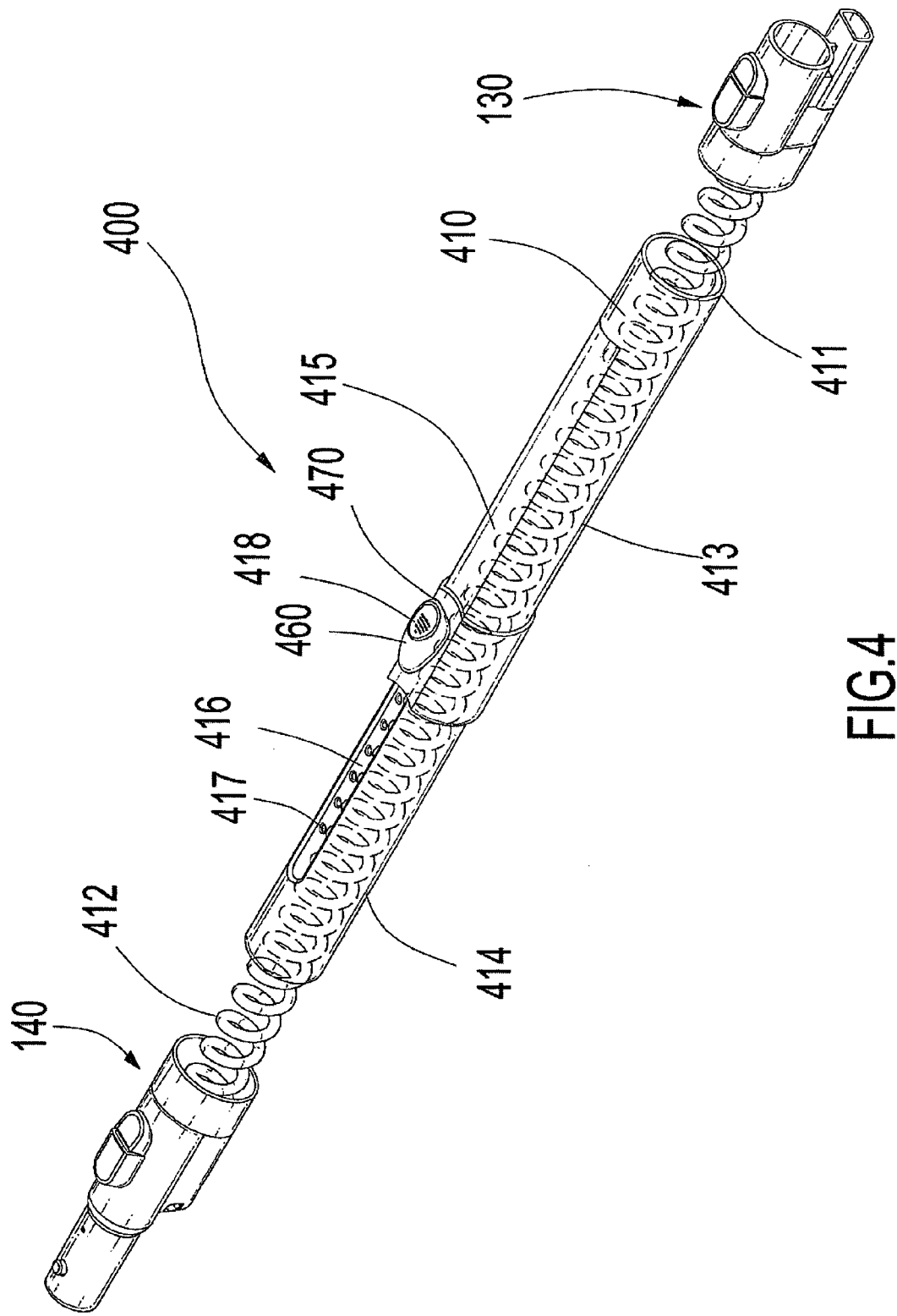
FIG. 4 is an alternative mode of a perspective view of the extensible electrical connecting device.

Referring to FIG. 4 of the drawings, an extensible electrical connecting device 400 according to an alternative embodiment is illustrated. The extensible electrical connecting device 400 comprises an extensible supporting bar device 410, the first electrical connecting base 130 and the second electrical connecting base 140. The extensible supporting bar device 410 is installed between one end of the first electrical connecting base 130 and one end of the second electrical connecting base 140. The extensible supporting bar device 410 further comprises a cavity 411 and an extensible electric cable 412 which is installed within the cavity 411. Both ends of the extensible electric cable 412 are respectively connected to the end of the first electrical connecting base 130 and the end of the second electrical connecting base 140.

The extensible supporting bar device 410 comprises a first supporting bar 413 and a second supporting bar 414 wherein the second supporting bar 414 is circularly engaged within the first supporting bar 413. One end of the first supporting bar 413 is connected to the first electrical connecting base 130 and one end of the second supporting bar 414 is connected to the second electrical connecting base 140. The distance between the first electrical connecting base 130 and the second electrical connecting base 140 can be changed according to the extendable and retractable feature of the structure. The distance between the first electrical connecting base 130 and the second electrical connecting base 140 changes in a synchronized coaxial fashion with respect to the extending and retracting motion of the structure.

The first supporting bar 413 further comprises a first slot 415, and the second supporting bar 414 comprises a second slot 416. The second slot 416 further comprises a plurality of indention 417 which is in a hemisphere shape indented into the second slot 416. The first slot 415 couples with the second slot 416 so that the position can be stabilized and to avoid any kind of rotational problem while the unit is extending or retracting.

The extensible supporting bar device 410 comprises a lock mechanism 418 which is installed on the first supporting bar 413. The lock mechanism 418 further comprises a lock 460 and a spring unit 470, and the lock 460 engages with indention 417 to lock the distance between the first electrical connecting base 130 and the second electrical connecting base 140. When a pressure is exerted on the spring unit 470, the lock 460 disengages with the indention 417 so that the distance between the first electrical connecting base 130 and the second electrical connecting base 140 can be adjust manually. The utilization of the spring unit 470 enables the lock mechanism 418 to function wherein the enforcing and releasing of the spring unit 470 determines the engagement and release between the lock 460 and the indention 417.

It is also worth to mention that in the preferred embodiment, the use of the slot structure should not be limited. Any devices that can stabilize the position and avoid rotational problem between the first supporting bar and the second supporting bar should be regarded as an alternative embodiment of the present invention.

Figure 5:
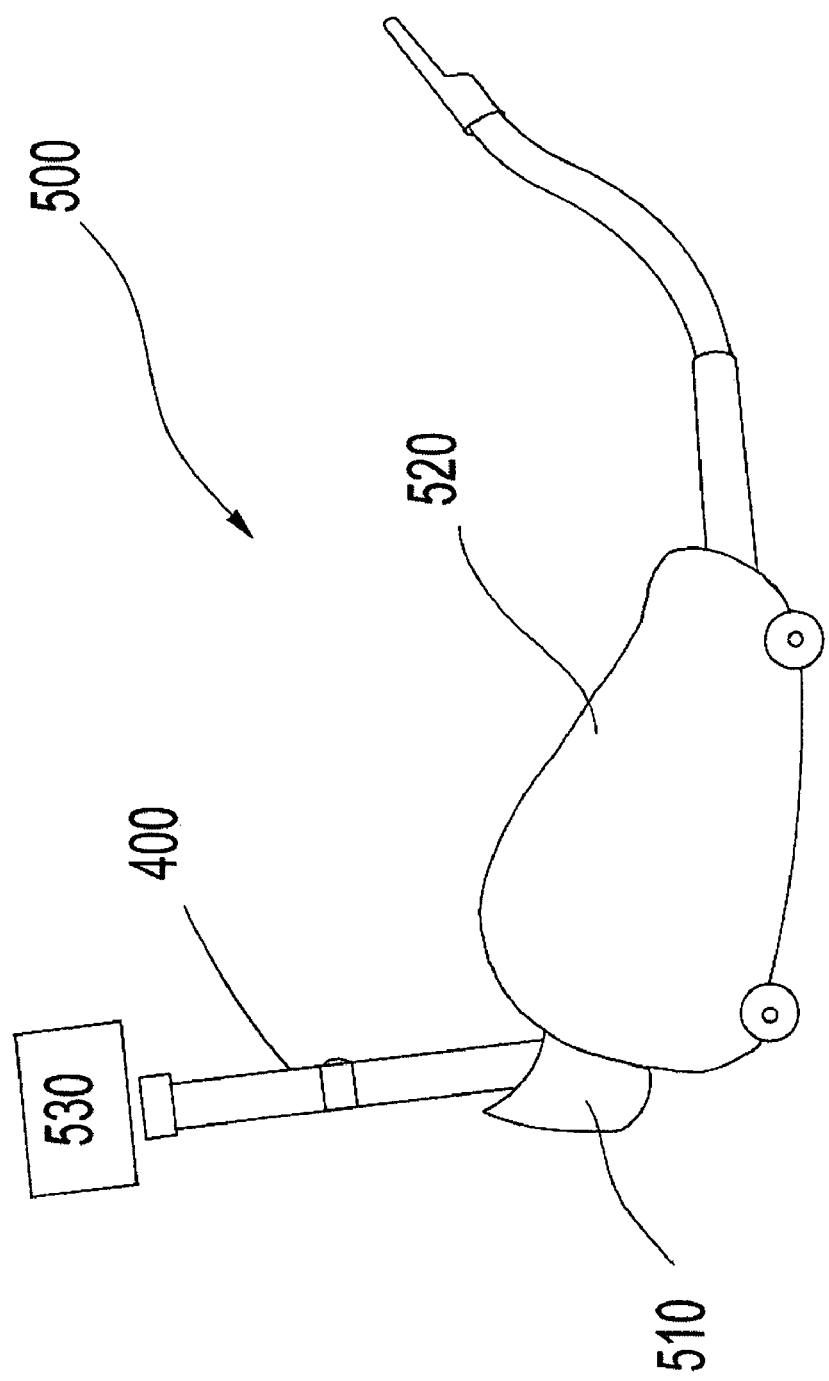
FIG. 5 is a perspective view of the vacuum machine with the use of the extensible electrical connecting device according to the alternative mode of the present invention.

Referring to FIG. 5 of the drawings, a vacuum machine 500 is illustrated. The vacuum machine 500 comprises the extensible electrical connecting device 400, a power input 510, and a vacuum unit 520. The power input 510 provides a connection between the second electrical connecting base 140 and the vacuum unit 520. A power source 530 is connected to the first electrical connecting base 130 so as to provide an electrical source to the vacuum unit 520 to function. The extensible electrical connecting device 400 can provide an extensible, easy to control, and reliable connection between the vacuum machine 500 and the power source 530. It is worth to mention that the use of the extensible electrical connecting device 400 should not be limited to the application of a vacuum machine as stated above. The present invention is useful to any electrical device that requires the use of electrical connecting device which can provide an extensible, easy to use, and reliable connection.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An extensible electrical connecting device comprising:
   an extensible supporting bar device;
   an extensible electric cable which is mainly made of elastic material capable of stretching;
   a first electrical connecting base which is connected to one end of said extensible supporting bar device and connected to one end of said extensible electric cable,
   a second electrical connecting base which is connected to another end of said extensible supporting bar device and connected to one end of said extensible electric cable, so that electricity can be conducted between said first electrical connecting base and said second electrical connecting base,
   an extensible electrical cable receiving device which is installed between said first electrical connecting base and said second electrical connecting base, wherein the extensible electrical cable receiving device comprises a first receiving member and a second receiving member, which is engaged within said first receiving member, and has a groove located within said extensible electrical cable receiving device wherein said extensible electric cable is received within said groove,
   thereby said extensible electric cable is capable to extend its length along with an extending motion of said extensible supporting bar device so as to provide an electrical connection between said first electrical connecting base and said second electrical connecting base.

2. The extensible electrical connecting device, as recited in claim 1, wherein said extensible supporting bar device further comprises a first supporting bar and a second supporting bar, which is circularly engaged within said first supporting bar.

3. The extensible electrical connecting device, as recited in claim 2, wherein said extensible supporting bar device and said extensible electrical cable receiving device extend and retract in a synchronize coaxial fashion.

4. The extensible electrical connecting device, as recited in claim 2, wherein said first supporting bar has a first slot, and said second supporting bar has a second slot, said first slot couples with said second slot so that the position can be stabilized and can eliminate any kind of rotational problem while extending or retracting.

5. The extensible electrical connecting device, as recited in claim 1, wherein said extensible electrical cable receiving device comprises a lock mechanism installed on the outer surface of said first receiving member so that the distance between said first electrical connecting base and said second electrical connecting base can be locked.

6. The extensible electrical connecting device, as recited in claim 5, wherein said lock mechanism comprises a lock and a spring unit, said second slot has a plurality of indentions, and said lock and spring unit engage with said indention to form a lock structure to lock or unlock the distance through the utilization of said spring unit.

7. A mobile electrical device comprising:
   an extensible electrical connecting device which comprises:

an extensible supporting bar device;

an extensible electrical cable receiving device having:

a groove inside said extensible electrical cable receiving device;

an extensible electric cable installed within said groove which is mainly made of elastic material capable of stretching, and said extensible electric cable is connected to a power source;

a first electrical connecting base which is connected to one end of said extensible supporting bar device and connected to one end of said extensible electrical cable receiving device, and also connected to one end of said extensible electric cable;

a second electrical connecting base which is connected to another end of said extensible supporting bar device and connected to another end of said extensible electrical cable receiving device, and also connected to another end of said extensible electric cable, so that electricity can be conducted between said first electrical connecting base and said second electrical connecting base;

a function actuator connected to a power input which provides an electric power source connection for said extensible electric cable and said function actuator, so that said function actuator is capable to perform the respective function of said mobile electrical device;

a first support bar; and a second supporting bar, which is circularly engaged within said first supporting bar; and a first receiving member; and a second receiving member, which is engaged within said first receiving member;

whereby said extensible electric cable is capable to extend its length along with the extending motion of said extensible supporting bar device so as to provide an electrical connection between said first electrical connecting base and said second electrical connecting base, therefore said mobile electrical device can carry out its respective function.

8. The extensible electrical connecting device, as recited in claim 7, wherein said extensible supporting bar device and said extensible electrical cable receiving device extend and refract in a synchronize coaxial fashion.

9. The extensible electrical connecting device, as recited in claim 7, wherein said first supporting bar has a first slot, and said second supporting bar has a second slot, said first slot couples with said second slot so that the position can be stabilized and can eliminate any kind of rotational problem while extending or retracting.

10. The extensible electrical connecting device, as recited in claim 7, wherein said extensible support bar device comprises a lock mechanism installed on the outer surface of said first receiving member so that the distance between said first electrical connecting base and said second electrical connecting base can be locked.

11. The extensible electrical connecting device, as recited in claim 10, wherein said lock mechanism comprises a lock and a spring unit, said second slot has a plurality of indentions, and said lock and said spring unit engage with said indention to form a lock structure to lock or unlock the distance through the utilization of said spring unit.

\* \* \* \* \*